United States Patent
Carlucci et al.

(10) Patent No.: US 8,752,104 B2
(45) Date of Patent: *Jun. 10, 2014

(54) TECHNIQUE FOR EFFECTIVELY PROVIDING VARIOUS ENTERTAINMENT SERVICES THROUGH A COMMUNICATIONS NETWORK

(75) Inventors: John B. Carlucci, Boulder, CO (US); Louis D. Williamson, Denver, CO (US)

(73) Assignee: Time Warner Cable Enterprises LLC, New York, NY (US)

( * ) Notice: Subject to any disclaimer, the term of this patent is extended or adjusted under 35 U.S.C. 154(b) by 62 days.

This patent is subject to a terminal disclaimer.

(21) Appl. No.: 12/589,579

(22) Filed: Oct. 26, 2009

(65) Prior Publication Data

US 2010/0050218 A1 Feb. 25, 2010

Related U.S. Application Data

(63) Continuation of application No. 11/000,844, filed on Dec. 1, 2004, now Pat. No. 7,610,606, which is a continuation-in-part of application No. 10/263,015, filed on Oct. 2, 2002.

(60) Provisional application No. 60/377,963, filed on May 3, 2002.

(51) Int. Cl.
*H04N 21/2385* (2011.01)

(52) U.S. Cl.
USPC .............. 725/95; 725/93; 725/98; 725/100

(58) Field of Classification Search
None
See application file for complete search history.

(56) References Cited

U.S. PATENT DOCUMENTS 4,476,488 A 10/1984 Merrell
5,253,066 A 10/1993 Vogel
(Continued)

FOREIGN PATENT DOCUMENTS

| WO | WO 00/54506 | 9/2000 |
|---|---|---|
| WO | WO 01/56285 | 8/2001 |
| WO | WO 01/56285 A1 | 8/2001 |
| WO | WO 01/95621 | 12/2001 |

OTHER PUBLICATIONS

Roy Furchgott, "Don't people want to control their T.V.s?", The New York Times, Aug. 24, 2000, Section G, p. 1, col. 2, Circuits, 2000 The New York Times Company.

(Continued)

*Primary Examiner* — Cai Chen
(74) *Attorney, Agent, or Firm* — Cozen O'Connor; Brandon N. Sklar

(57) ABSTRACT

A switched broadcast service and a network personal video recorder (NPVR) service are provided synergistically in a cable TV system having limited resources. For example, in providing the switched broadcast service, a resource manager allocates network bandwidth for broadcast of materials from selected program channels on an as needed basis. Such allocation is conducive to an effective provision of the NPVR service which requires dedicated bandwidth for transmitting recorded broadcast program material in a headend to each set-top terminal requesting the NPVR service. Thus, unlike the switched broadcast service where a program stream containing program material is shared by one or more set-top terminals, the NPVR service provides a dedicated program stream to each set-top terminal so that a user at the terminal may manipulate (e.g., rewind, pause and/or fast-forward) a presentation of program material at will.

26 Claims, 10 Drawing Sheets

(56) References Cited

U.S. PATENT DOCUMENTS

| | | | |
|---|---|---|---|
| 5,285,272 A | 2/1994 | Bradley et al. | |
| 5,335,277 A | 8/1994 | Harvey et al. | |
| 5,357,276 A | 10/1994 | Banker et al. | |
| 5,371,551 A | 12/1994 | Logan et al. | |
| 5,377,051 A | 12/1994 | Lane et al. | |
| 5,436,917 A | 7/1995 | Karasawa | |
| 5,477,263 A | 12/1995 | O'Callaghan et al. | |
| 5,479,303 A | 12/1995 | Suzuki et al. | |
| 5,517,257 A | 5/1996 | Dunn et al. | |
| 5,543,927 A | 8/1996 | Herz | |
| 5,550,640 A | 8/1996 | Tsuboi et al. | |
| 5,559,549 A | 9/1996 | Hendricks et al. | |
| 5,568,200 A | 10/1996 | Pearlstein et al. | |
| 5,579,183 A | 11/1996 | Van Gestel et al. | |
| 5,606,359 A | 2/1997 | Youden et al. | |
| 5,625,406 A | 4/1997 | Newberry et al. | |
| 5,659,350 A | 8/1997 | Hendricks et al. | |
| 5,671,386 A | 9/1997 | Blair et al. | |
| 5,687,275 A | 11/1997 | Lane et al. | |
| 5,699,360 A | 12/1997 | Nishida et al. | |
| 5,710,970 A | 1/1998 | Walters et al. | |
| 5,721,878 A | 2/1998 | Ottesen et al. | |
| 5,727,113 A | 3/1998 | Shimoda | |
| 5,729,648 A | 3/1998 | Boyce et al. | |
| 5,748,254 A | 5/1998 | Harrison et al. | |
| 5,771,335 A | 6/1998 | Lee | |
| 5,793,410 A * | 8/1998 | Rao | 725/120 |
| 5,799,128 A | 8/1998 | Van Den Enden | |
| 5,805,762 A | 9/1998 | Boyce et al. | |
| 5,805,763 A | 9/1998 | Lawler et al. | |
| 5,822,018 A | 10/1998 | Farmer | |
| 5,822,493 A | 10/1998 | Uehara et al. | |
| 5,822,793 A | 10/1998 | Tokura et al. | |
| 5,850,218 A | 12/1998 | LaJoie et al. | |
| 5,915,068 A | 6/1999 | Levine | |
| 5,933,498 A | 8/1999 | Schneck et al. | |
| 5,982,436 A | 11/1999 | Balakrishnan et al. | |
| 6,005,603 A | 12/1999 | Flavin | |
| 6,006,241 A | 12/1999 | Purnaveja et al. | |
| 6,046,760 A | 4/2000 | Jun | |
| 6,052,588 A | 4/2000 | Mo et al. | |
| 6,055,358 A | 4/2000 | Traxlmayr | |
| 6,065,050 A | 5/2000 | DeMoney | |
| 6,091,884 A | 7/2000 | Yuen et al. | |
| 6,108,002 A | 8/2000 | Ishizaki | |
| 6,115,532 A | 9/2000 | Saeki | |
| 6,118,922 A | 9/2000 | Van Gestel et al. | |
| 6,161,169 A | 12/2000 | Cheng | |
| 6,172,712 B1 | 1/2001 | Beard | |
| 6,177,931 B1 | 1/2001 | Alexander et al. | |
| 6,233,389 B1 | 5/2001 | Barton et al. | |
| 6,253,375 B1 | 6/2001 | Gordon et al. | |
| 6,259,736 B1 | 7/2001 | Chujoh et al. | |
| 6,314,572 B1 | 11/2001 | LaRocca et al. | |
| 6,324,338 B1 | 11/2001 | Wood et al. | |
| 6,327,275 B1 | 12/2001 | Gardner et al. | |
| 6,351,596 B1 | 2/2002 | Ostrover | |
| 6,370,319 B1 | 4/2002 | Matsumoto et al. | |
| 6,378,130 B1 | 4/2002 | Adams | |
| 6,389,218 B2 | 5/2002 | Gordon et al. | |
| 6,442,328 B1 | 8/2002 | Elliott et al. | |
| 6,445,738 B1 | 9/2002 | Zdepski et al. | |
| 6,510,554 B1 | 1/2003 | Gordon et al. | |
| 6,515,680 B1 | 2/2003 | Hendricks et al. | |
| 6,532,593 B1 | 3/2003 | Moroney | |
| 6,549,718 B1 | 4/2003 | Grooters et al. | |
| 6,603,488 B2 | 8/2003 | Humplemann et al. | |
| 6,603,739 B1 | 8/2003 | Dubuc | |
| 6,609,253 B1 | 8/2003 | Swix et al. | |
| 6,628,302 B2 | 9/2003 | White et al. | |
| 6,643,053 B2 | 11/2003 | Li et al. | |
| 6,675,384 B1 | 1/2004 | Block et al. | |
| 6,721,794 B2 | 4/2004 | Taylor et al. | |
| 6,744,967 B2 | 6/2004 | Kaminski et al. | |
| 6,771,317 B2 | 8/2004 | Ellis et al. | |
| 6,778,708 B1 | 8/2004 | Divakaran et al. | |
| 6,842,446 B2 | 1/2005 | Everson et al. | |
| 6,853,728 B1 | 2/2005 | Kahn et al. | |
| 6,938,268 B1 | 8/2005 | Hodge | |
| 6,965,724 B1 | 11/2005 | Boccon-Gibod et al. | |
| 6,980,594 B2 | 12/2005 | Wang et al. | |
| 7,024,678 B2 | 4/2006 | Gordon et al. | |
| 7,027,516 B2 | 4/2006 | Anderson et al. | |
| 7,028,329 B1 | 4/2006 | Mizutani | |
| 7,073,189 B2 | 7/2006 | McElhatten et al. | |
| 7,096,488 B1 | 8/2006 | Zhang et al. | |
| 7,159,233 B2 | 1/2007 | Son et al. | |
| 7,409,140 B2 | 8/2008 | Rodriguez et al. | |
| 7,536,705 B1 | 5/2009 | Boucher et al. | |
| 7,610,606 B2 * | 10/2009 | Carlucci et al. | 725/95 |
| 7,614,066 B2 | 11/2009 | Urdang et al. | |
| 7,908,626 B2 | 3/2011 | Williamson et al. | |
| 2001/0021926 A1 | 9/2001 | Schneck et al. | |
| 2002/0016970 A1 | 2/2002 | Negishi et al. | |
| 2002/0042924 A1 | 4/2002 | Adams | |
| 2002/0059621 A1 | 5/2002 | Thomas et al. | |
| 2002/0059623 A1 * | 5/2002 | Rodriguez et al. | 725/91 |
| 2002/0059626 A1 * | 5/2002 | Lemmons | 725/95 |
| 2002/0075402 A1 | 6/2002 | Robson et al. | |
| 2002/0104093 A1 | 8/2002 | Buehl et al. | |
| 2002/0107940 A1 | 8/2002 | Brassil | |
| 2002/0131498 A1 | 9/2002 | Sun et al. | |
| 2002/0138831 A1 | 9/2002 | Wachtfogel et al. | |
| 2002/0144262 A1 | 10/2002 | Plotnick et al. | |
| 2002/0174438 A1 | 11/2002 | Cleary et al. | |
| 2002/0191959 A1 | 12/2002 | Lin et al. | |
| 2002/0194589 A1 | 12/2002 | Cristofalo et al. | |
| 2003/0007092 A1 | 1/2003 | Sonner et al. | |
| 2003/0028882 A1 | 2/2003 | Davis et al. | |
| 2003/0048671 A1 | 3/2003 | Yoshikawa et al. | |
| 2003/0093800 A1 | 5/2003 | Demas et al. | |
| 2003/0118243 A1 | 6/2003 | Sezer et al. | |
| 2003/0149988 A1 * | 8/2003 | Ellis et al. | 725/87 |
| 2003/0159151 A1 | 8/2003 | Ikeda | |
| 2003/0172376 A1 | 9/2003 | Coffin, III | |
| 2003/0208767 A1 | 11/2003 | Williamson et al. | |
| 2004/0015999 A1 | 1/2004 | Carlucci et al. | |
| 2004/0040035 A1 | 2/2004 | Carlucci et al. | |
| 2004/0078817 A1 | 4/2004 | Horowitz et al. | |
| 2004/0078829 A1 | 4/2004 | Patel et al. | |
| 2004/0244058 A1 | 12/2004 | Carlucci et al. | |
| 2004/0255336 A1 | 12/2004 | Logan et al. | |
| 2005/0125841 A1 | 6/2005 | Helms et al. | |
| 2005/0283800 A1 | 12/2005 | Ellis et al. | |

OTHER PUBLICATIONS

"PVR copyright concerns raised", Audio Week, Aug. 23, 1999, section: This Week's News, 1999 Warren Publishing, Inc.

Dale Buss, "Ultra TV", Brandmarketing, Sep. 1999, vol. VI, No. 9, p. 74, ISSN 1091-6962, Fairchild Publications.

Brian Lowry, "Television, as you like it; Today's gadgetry is smart enough to let viewers choose camera angles, or kick back and rewind as the action unfolds live. Watch it, and it watches back",Los Angeles Times, Feb. 13, 2000, section: Calendar, p. 8, Calendar Desk, 2000 Times Mirror Company.

Christopher Grimes and Peter Thal Larsen, "Inside Track: TV viewers can box clever: Technology Video Recorders: personal video recorders will be a godsend for viewers. But what about the schedulers", Financial Times London Ed., Jun. 23, 2000, p. 18, ISSN 0307-1766.

Patricia Sabga; Charles Molineaux, "TiVo—CEO, CNNfn", transcript # 00090110FN-107, interview Michael Ramsay, The N.E.W. Show, Sep. 1, 2000, Fri. 5:18 p.m. EST, 2000 Cable News Network.

Mary Kathleen Flynn; Steve Young, "Interactive TV, CNNfn", transcript #00081407FN-111 of interview Josh Bernoff, Digital Jam, Aug. 14, 2000, Mon. 8:08 p.m. EST, 2000 Cable News Network.

"More 'convergence' digital video recorders emerge", Video Week, Jun. 19, 2000, section: This Week's News, 2000 Warren Publishing, Inc.

"TiVo and replay sign cable deals to boost PVR distribution", Warren's Cable Regulation Monitor,Aug. 21, 2000, section: This Week's News, 2000 Warren Publishing, Inc.

(56) References Cited

OTHER PUBLICATIONS

"Future VOD role of studios vs. other companies debated", Video Week, Apr. 10, 2000, section: This Week's News, 2000 Warren Publishing, Inc.

Raymond Snoddy, "The TiVo—T.V.'s nemesis?", Times Newspapers Ltd., Sep. 1, 2000, section: Features, 2000 Times Newspapers Limited (the Times London).

Marc Gunther; Irene Gashurov, "When techology attacks!; Your T.V. is looking weird.Network executives are getting flustered. Viewing choices are exploding. That's what happens . . . ", Fortune, Mar. 6, 2000, section: Features/Television, p. 152, 2000 Time Inc.

"Independent study shows TiVo service increases enjoyment and changes people's attitudes towards T.V.", PR Newswire, May 2, 2000, 2000 FT Asia Intelligence Wire; 2000 PR Newswire.

Kale, RFC 1180 "A TCP/IP Tutorial", Jan. 1991, Spider Systems Limited, Section 4 "ARP".

Ramakrishnan, K. K., Lev Vaitzblit, Cary Gray, Uresh Vahalia, Dennis Ting, Percy Tzelnic, Steve Glaser, and Wayne Duso. "Operating System Support for a Video-on-demand File Service." Network and Operating System Support for Digital Audio and Video Lecture Notes in Computer Science, 846 (1994): 216-27. Web. Jul. 25, 2013. <http://citeseerx.ist.psu.edu/viewdoc/download?doi=10.1.1.121. 1381&rep=rep1&type=pdf>.

\* cited by examiner

850

| PROGRAM CHANNEL X | $N_{PCHX}$ | TSID | PID | CARRIER ID |
|---|---|---|---|---|
| 1 | 0 | NULL | NULL | NULL |
| 2 | 12 | 4 | 1001 | $C_4$ |
| 5 | 40 | 1 | 1003 | $C_3$ |
| 9 | 6 | 4 | 1004 | $C_4$ |
| ⋮ | ⋮ | ⋮ | ⋮ | ⋮ |

854 — Program Channel X
855 — $N_{PCHX}$
856 — TSID
857 — PID
858 — CARRIER ID

863 — row 1
861 — row 2

FIG. 4

| | CARRIER | TSID | PID | MODULATOR/ INPUT PORT | HUB SWITCH INPUT PORT | PROGRAM STREAM |
|---|---|---|---|---|---|---|
| 481 | $C_1$ | 1 | 1001 | M1/P1 | SWP 2 | BPS-5 |
| | $C_1$ | 1 | 1002 | M1/P2 | SWP 5 | BP2-16 |
| | $C_1$ | 1 | 1003 | M1/P3 | SWP 7 | BPS-9 |
| | $C_1$ | 1 | 1004 | M1/P4 | SWP 1 | DPS-2 |
| 485 | $C_1$ | 1 | 1005 | M1/P5 | NULL | NULL |
| | ⋮ | ⋮ | ⋮ | ⋮ | ⋮ | ⋮ |
| | $C_2$ | 2 | 1001 | M2/P1 | SWP 12 | DPS-10 |
| | $C_2$ | 2 | 1002 | M2/P2 | SWP 6 | DPS-30 |
| | ⋮ | ⋮ | ⋮ | ⋮ | ⋮ | ⋮ |

FIG. 6

TECHNIQUE FOR EFFECTIVELY PROVIDING VARIOUS ENTERTAINMENT SERVICES THROUGH A COMMUNICATIONS NETWORK

RELATED APPLICATIONS

The present application is a continuation of U.S. patent application Ser. No. 11/000,844, which was filed on Dec. 1, 2004, which is a continuation-in-part of U.S. patent application Ser. No. 10/263,015, which was filed on Oct. 2, 2002 and claims the benefit of Provisional Patent Application No. 60/377,963, which was filed on May 3, 2002, which are assigned to the assignee of the present application, and are incorporated by reference herein.

FIELD OF THE INVENTION

The invention relates to communications systems and methods, and more particularly to a system and method for delivering information and entertainment programs through a communications network, e.g., a cable TV network.

BACKGROUND OF THE INVENTION

Digital video recorders (DVRs), also known as "personal video recorders (PVRs)," e.g., TiVo and ReplayTV devices, are popular nowadays, stemming from their capabilities of "pausing", "rewinding" and "fast-forwarding" live television (TV) broadcast while it is being recorded. They may also offer such other functions as "one-touch programming" for automatically recording every episode of a show for an entire season, "commercial advance" for automatically skipping through commercials while watching recorded broadcast, an "on-screen guide" for looking up recorded programs to view, etc. The DVRs may also suggest programs for recording based on a user's viewing habit.

With the advent of digital communications technology, many TV broadcast streams are transmitted in digital formats. For example, Digital Satellite System (DSS), Digital Broadcast Services (DBS), and Advanced Television Standards Committee (ATSC) broadcast streams are digitally formatted pursuant to the well known Moving Pictures Experts Group 2 (MPEG-2) standard. The MPEG-2 standard specifies, among others, the methodologies for video and audio data compressions which allow multiple programs, with different video and audio feeds, to be multiplexed in a transport stream traversing a single broadcast channel. A digital TV receiver may be used to decode an MPEG-2 encoded transport stream, and extract the desired program therefrom. The prior art DVRs take advantage of MPEG-2 compression of video and audio data to maximize use of their limited storage capacity.

MPEG-2 Background

In accordance with the MPEG-2 standard, video data may be compressed based on a sequence of groups of pictures (GOPs), made up of three types of picture frames—intra-coded picture frames ("I-frames"), forward predictive frames ("P-frames") and bilinear frames ("B-frames"). Each GOP may, for example, begin with an I-frame which is obtained by spatially compressing a complete picture using discrete cosine transform (DCT). As a result, if an error or a channel switch occurs, it is possible to resume correct decoding at the next I-frame.

The GOP may represent additional frames by providing a much smaller block of digital data that indicates how small portions of the I-frame, referred to as macroblocks, move over time.

An I-frame is typically followed by multiple P- and B-frames in a GOP. Thus, for example, a P-frame occurs more frequently than an I-frame by a ratio of about 3 to 1. A P-frame is forward predictive and is encoded from the I- or P-frame that precedes it. A P-frame contains the difference between a current frame and the previous I- or P-frame.

A B-frame compares both the preceding and subsequent I- or P-frame data. The B-frame contains the average of matching macroblocks or motion vectors. Because a B-frame is encoded based upon both preceding and subsequent frame data, it effectively stores motion information.

Thus, MPEG-2 achieves its compression by assuming that only small portions of an image change over time, making the representation of these additional frames extremely compact. Although GOPs have no relationship between themselves, the frames within a GOP have a specific relationship which builds off the initial I-frame.

The compressed video and audio data are carried by continuous elementary streams, respectively, which are broken into access units or packets, resulting in packetized elementary streams (PESs). These packets are identified by headers that contain time stamps for synchronizing, and are used to form MPEG-2 transport streams. For digital broadcasting, multiple programs and their associated PESs are multiplexed into a single transport stream. A transport stream has PES packets further subdivided into short fixed-size data packets, in which multiple programs encoded with different clocks can be carried. A transport stream not only comprises a multiplex of audio and video PESs, but also other data such as MPEG-2 program specific information (sometimes referred to as metadata) describing the transport stream. The MPEG-2 metadata may include a program associated table (PAT) that lists every program in the transport stream. Each entry in the PAT points to an individual program map table (PMT) that lists the elementary streams making up each program. Some programs are open, but some programs may be subject to conditional access (encryption) and this information is also carried in the MPEG-2 transport stream, possibly as metadata.

The aforementioned fixed-size data packets in a transport stream each carry a packet identifier (PID) code. Packets in the same elementary streams all have the same PID, so that a decoder can select the elementary stream(s) it needs and reject the remainder. Packet-continuity counters may be implemented to ensure that every packet that is needed to decode a stream is received.

SUMMARY OF THE INVENTION

The invention is directed to effectively providing various services, in an integrated fashion, to deliver program material to devices (e.g., set-top terminals) in an area over a communications network, e.g., a cable TV network. One such service may be a "switched broadcast" service where transmission channels in the cable TV network are dynamically allocated to broadcast program channel material to the devices in the area on an as needed basis. That is, if no device in the area requests material of a particular program channel, no transmission channel is allocated to transmit such material to the area, thereby conserving limited network resources.

The invention is premised upon the recognition that the switched broadcast is conducive to effectively providing other services through the cable TV network, especially if they are bandwidth intensive. One such bandwidth intensive service may be a network PVR (NPVR) service. In accordance with the NPVR service, broadcast programs (or at least those broadcast programs associated with NPVR enabled program channels), which are provided according to a broadcast schedule, are recorded at a headend of a cable TV network before they are delivered to a set-top terminal. Thus, a user at a set-top terminal may "reserve," for later review, not only in-progress (or live) programs and future programs, but also previously broadcast programs since they have been recorded at the headend regardless of any user request. In other words, the NPVR service obviates the need of a proactive effort otherwise required of a typical DVR user, which includes deciding and actively electing in advance what shows to record. In addition, the NPVR service furnishes trick mode functions (e.g., rewind, pause and fast-forward functions) for manipulating a presentation of recorded programming content.

Thus, in accordance with an aspect of the invention, in response to a request for program material attributed to a selected program channel, which is received from a device in an area, a determination is made whether the selected program channel is associated with a first service (e.g., the switched broadcast service) or a second service (e.g., the NPVR service). If the selected program channel is associated with the switched broadcast service, a program stream of a first type (e.g., a broadcast program stream) containing the requested program material is identified to the device. The broadcast program stream is provided to the area for sharing with other devices in the area, in accordance with the switched broadcast service. Otherwise, if the selected program channel is associated with the NPVR service, a program stream of a second type (e.g., a dedicated program stream) is generated which contains the requested program material for exclusive use by the device, in accordance with the NPVR service. The dedicated program stream is integrated with at least one broadcast program stream in a transport stream transmitted to the area.

The inventive integrated service fully realizes the synergies between the switched broadcast service and the NPVR service. In addition to better utilization of network bandwidth by the integrated service relative to the individual service components, the integrated service achieves cost-effectiveness and superior service quality as the two service components share many common network resources. For example, both service components share the same switching fabric, modulation facility, etc., and benefit, e.g., from use of the same acquisition/staging processor (described below) which, among others, encodes digital content to be delivered at a constant bit rate (CBR) to eliminate otherwise complex data rate shaping or re-quantization downstream.

Thus, in accordance with another aspect of the invention, limited network resources are allocated for realizing at least first and second services (e.g., the switched broadcast and NPVR services) in an integrated fashion to deliver program material to an area. To realize the switched broadcast service, one or more program streams containing broadcast program material are provided to the area. Each of the one or more program streams is received by one or more devices (e.g., set-top terminals) in the area. Provision of a selected one of the program streams to the area is withheld when the number of devices in the area receiving the selected program stream becomes zero, thereby making available an amount of resource. At least part of the available resource is allocated to provide a program stream containing program material for exclusive use by a device in the area, in accordance with the NPVR service.

BRIEF DESCRIPTION OF THE DRAWINGS

Further objects, features and advantages of the invention will become apparent from the following detailed description taken in conjunction with the accompanying drawing showing illustrative embodiments of the invention, in which:

FIG. 4 illustrates a usage table for providing a switched broadcast service, in accordance with an embodiment of the invention;

FIG. 6 illustrates a resource assignment table for managing the limited system resources to provide switched broadcast and NPVR services, in accordance with an embodiment of the invention;

DETAILED DESCRIPTION

Figure 1:
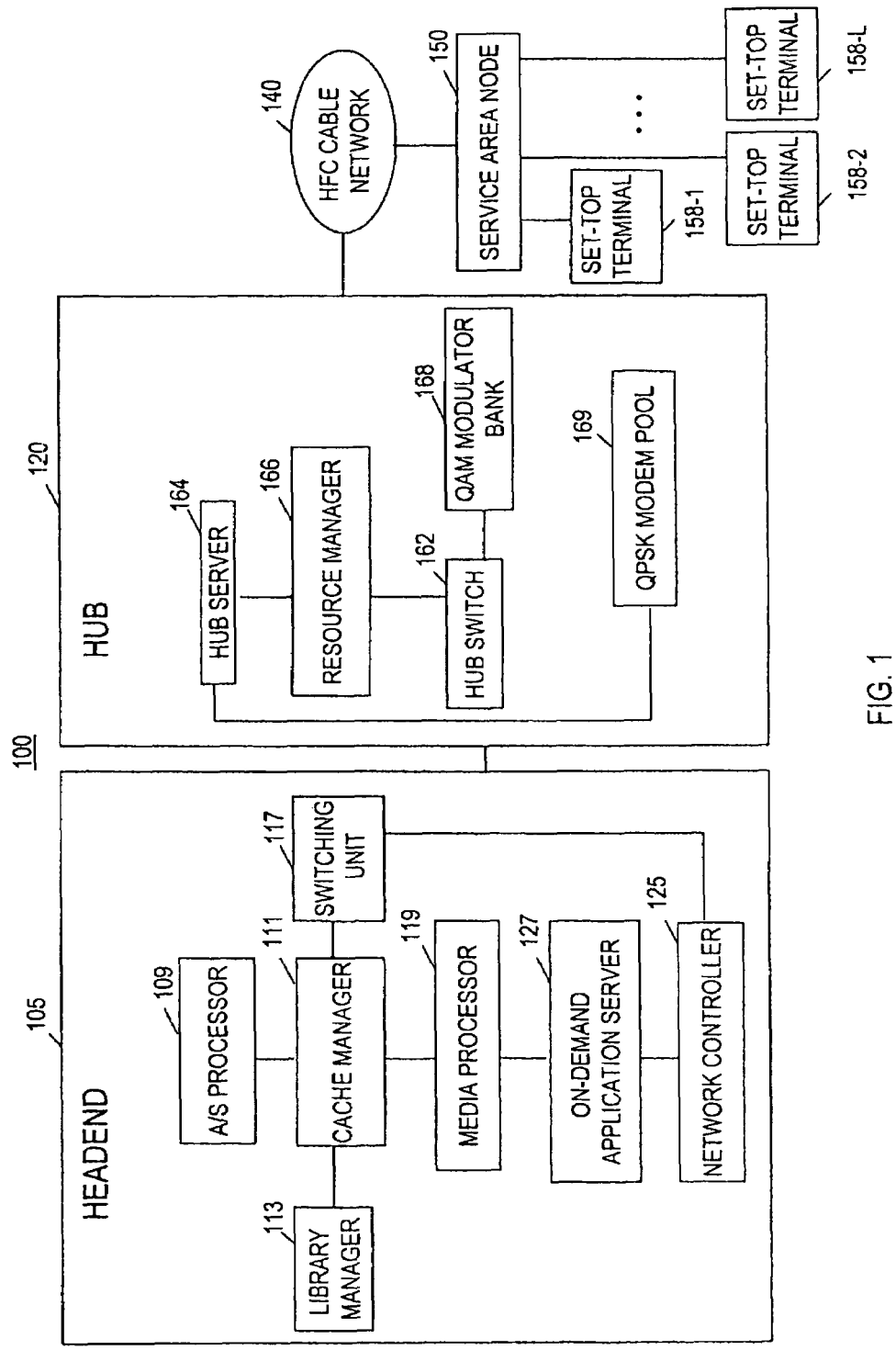
FIG. 1 is a block diagram of a broadband communications system, in accordance with an embodiment of the invention.

The invention is directed to effectively utilizing limited resources of a communications network, e.g., a cable TV network, to provide various entertainment services. For example, in accordance with a "switched broadcast" technique, transmission channels in the cable TV network are dynamically allocated to broadcast program channel materials to users in a neighborhood (or a service area) on an as needed basis. That is, if no user in the neighborhood requests material of a particular program channel, no transmission channel is allocated to transmit such material to the neighborhood, thereby conserving limited network bandwidth. It should be noted at this point that the term "transmission channel" should not be confused with a "program channel." A "transmission channel" signifies a designated frequency band through which a transport stream containing program material is transmitted. On the other hand, a "program channel" signifies the source of the program material selected by a user to view. For example, a user may select program channel 2 to view program material provided by CBS, program channel 14 to view program material provided by ESPN; program channel 32 to view program material provided by MTV, etc.

By way of example, a user at a set-top terminal in a neighborhood may turn on the TV associated therewith and select a program channel, say program channel 2. Alternatively, the user may change from another program channel to program channel 2. In accordance with the switched broadcast technique, the set-top terminal sends a channel 2 request, e.g., to a hub facility in the cable TV network, where a hub server may determine whether any transport stream containing channel 2 material is currently being transmitted to the neighborhood. If so, the hub server identifies to the user's set-top terminal the ID of the transport stream (TSID) from which the channel 2 material can be extracted. Otherwise, if the channel 2 material is not currently provided to the neighborhood, the hub server causes a transport stream to be assigned to carry the channel 2 material to the neighborhood. It should be noted that in this illustrative embodiment the hub server resides in a hub. However, it will be appreciated that all or part of the hub server functionality may reside in the headend or elsewhere, instead.

The invention is premised upon the recognition that use of the aforementioned switched broadcast technique is conducive to effectively providing other services through the cable TV network, especially if they are bandwidth intensive. For example, the cable TV industry has been fervently pursuing a "network PVR (NPVR)" service allowing a user to perform the analogous DVR functions through use of a network, rather than a local DVR device (e.g., a prior art DVR or DVR set-top terminal) at the user premises. In fact, a network architecture and functionalities for implementing the NPVR service have been developed and are described, e.g., in copending commonly assigned application Ser. No. 10/302,550, filed on Nov. 22, 2002, hereby incorporated by reference. In accordance with the NPVR service, broadcast programs (or at least those broadcast programs associated with the NPVR enabled program channels), which are provided according to a broadcast schedule, are recorded at a headend of a cable network before they are delivered to a set-top terminal. Thus, a user at a set-top terminal may "reserve," for later review, not only in-progress (or live) programs and future programs, but also previously broadcast programs since they have been recorded at the headend regardless of any user request. In other words, the NPVR service obviates the need of a proactive effort otherwise required of a typical DVR user, which includes deciding and actively electing in advance what shows to record. In addition, the NPVR service furnishes trick mode functions (e.g., rewind, pause and fast-forward functions) for manipulating a presentation of recorded programming content.

In accordance with an aspect of the invention, by using limited network resources, the aforementioned switched broadcast technique is implemented synergistically with the NPVR service, which is bandwidth intensive. For example, a user at a set-top terminal requesting material from an NPVR enabled program channel may be provided with a dedicated program stream for his/her exclusive use so that the user may rewind, pause and/or fast-forward the program presentation at will. Thus, unlike a program stream in switched broadcast which may be shared by one or more set-top terminals in a neighborhood, a dedicated program stream in the NPVR service is not shared with other set-top terminals.

In addition to better utilization of network bandwidth by the inventive integrated service relative to the individual service components (i.e., switched broadcast and NPVR service components), the integrated service achieves cost-effectiveness and superior service quality as the two service components share many common network resources. For example, both service components share the same switching fabric, modulation facility, etc., and benefit, e.g., from use of the same acquisition/staging processor (described below) which, among others, encodes digital content to be delivered at a constant bit rate (CBR) to eliminate otherwise complex data rate shaping or re-quantization downstream.

FIG. 1 illustrates broadband communications system 100 embodying the principles of the invention for providing switched broadcast and other services, such as the NPVR service, to set-top terminals on the user premises. As shown in FIG. 1, system 100 includes headend 105, hub 120, hybrid fiber coax (HFC) cable network 140 and different service area nodes including node 150, which in this instance is connected to set-top terminals 158-1 through 158-L in a neighborhood (or a service area), where L represents an integer. Transmission channels are assigned in a manner described below to carry transport streams containing program material from headend 105 to set-top terminals, which, also known as "in-band" channels, may be 6 MHz bands populating a forward passband, e.g., 350-750 MHz band (or 350-860 MHz band in another embodiment), of a coaxial cable.

Headend 105 receives programs and services from various providers and sources, e.g., analog and digital satellite sources, application servers, media servers, the Internet, etc. Analog and digital satellite sources typically provide the traditional forms of television broadcast programs and information services. Application servers typically provide executable code and data for application specific services such as database services, network management services, transactional electronic commerce services, system administration console services, application specific services (such as stock ticker, sports ticker, weather and interactive program guide data), resource management service, connection management services, subscriber cares services, billing services, operation system services, and object management services. Media servers provide time-critical media assets such as MPEG-2 encoded video and audio, MPEG-2 encoded still images, bit-mapped graphic images, PCM digital audio, three dimensional graphic objects, application programs, application data files, etc. Although specific examples of programs and services which may be provided by the aforementioned sources are given herein, other programs and services may also be provided by these or other sources without departing from the spirit and scope of the invention.

Acquisition/Staging (A/S) processor 109 in headend 105 processes program streams from one or more of the aforementioned sources in analog and digital forms. Analog TV program streams may be formatted according to the National Television Standards Committee (NTSC) or Phase Alternating Line (PAL) broadcast standard. Digital TV program streams may be formatted according to the Digital Satellite System (DSS), Digital Broadcast Services (DBS), or Advanced Television Standards Committee (ATSC) standard. Processor 109, among others, extracts program content in the analog and digital TV program streams and reformats the content to form MPEG-2 encoded transport streams, respectively. Such reformatting may even be applied to those received streams already in an MPEG-2 format. This stems from the fact that the digital content in the received MPEG-2 streams may be encoded at a variable bit rate (VBR), or with interlaced I-frames or long GOP sequences. To avoid data burstiness, processor 109 may in a conventional manner re-encode such digital content at a constant bit rate (CBR) to form the aforementioned transport streams. Encoding digital content at a CBR may also eliminate the need for otherwise complex data rate-shaping or re-quantization downstream. In this particular illustrative embodiment, each transport stream generated by A/S processor 109 comprises a respective MPEG-2 encoded program stream, hereinafter referred to as a "single program stream (SPS) transport stream," as distinguished from a transport stream having multiple MPEG 2 encoded program streams multiplexed therein, hereinafter referred to as a "multiple program stream (MPS) transport stream."

A/S processor 109 may receive "assets" including pre-staged movie videos, news reports, sports events, etc. from content providers. However, processor 109 may also create "assets" in real time while processing received program materials which are not pre-staged by the content providers. In general, an "asset" is a container for (or a pointer indicating a memory address of) any object or set of objects that may be desired to implement a service, including video, audio, images, application executables, scripts, configuration files, text, fonts, and HTML pages. In addition to the raw content, metadata (not to be confused with MPEG-2 metadata) is also a part of an asset object that describes characteristics of the asset. For example, asset metadata may describe attributes that are inherent in the content of the asset, such as the format, duration, size, or encoding method. Values for asset metadata are determined at the time the asset is created.

Figure 2:
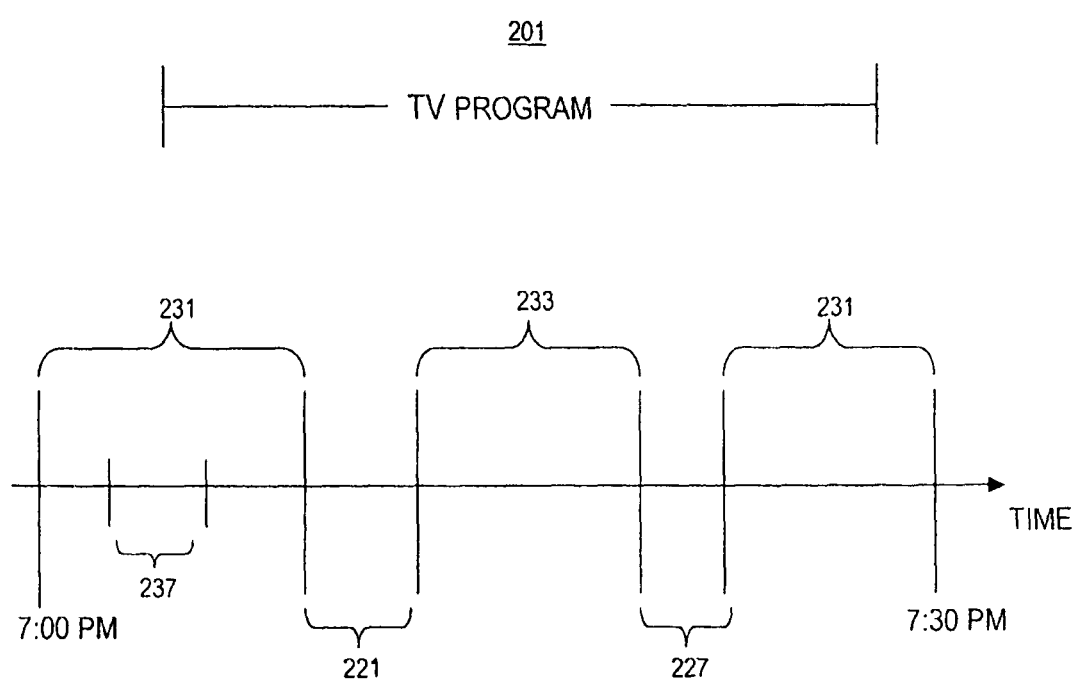
FIG. 2 illustrates a TV program provided by the system of FIG. 1.

In this illustrative embodiment, an asset concerning a program includes a metadata file and trick files associated with the program, in addition to the program content contained in a broadcast stream. FIG. 2 illustrates TV program 201 which spans from 7:00 p.m. to 7:30 p.m. Program 201 comprises a show interrupted by commercials, which is typical. Thus, the program content in this instance consists of show segments 231, 233 and 235, interleaved with commercial segments 221 and 227. The TV streams received by processor 109 are pre-processed, e.g., by the providers, to include indicators, e.g., cue-tones, on which processor 109 relies to identify the demarcations (or edges) of different programs and program segments within each program. Alternatively, they may be identified by a predetermined programming schedule. Thus, in this instance before processor 109 processes the TV stream containing TV program 201, a first cue-tone is inserted at the beginning of segment 231, indicating the beginning of TV program 201; second cue-tones are inserted at the beginnings of segments 221 and 227, indicating the beginnings of the respective commercial breaks; third cue-tones are inserted at the ends of segments 221 and 227, indicating the ends of the respective commercial breaks; and a fourth cue-tone is inserted at the end of segment 235, indicating the end of TV program 201. In accordance with another aspect of the invention, another set of cue-tones may be inserted to delimit a "chapter" (denoted 237) within a program. A chapter is a self-contained subprogram, e.g., a skit, monolog, song performance, news report, weather report, etc. within a program. With the cue-tones defining one such chapter, processor 109 is capable of identifying the chapter and create an asset concerning the same.

Let's assume that TV program 201 in this instance is an initial broadcast program. Processor 109, among other things, collects in a database (not shown) program guide data associated with different TV programs which are not pre-staged (including TV program 201 in this instance) from an application server, which may be different from the sources of the TV programs themselves. Each program when presented to processor 109 is identified by a program designation, which may be used to locate the corresponding program guide data. In particular, processor 109 while processing TV program 201 may locate the corresponding program guide data to create in real time the metadata file associated with TV program 201. The metadata file thus created includes such data as the title, rating (e.g., G, PG-13, R, etc.), names of the producer, director, and actors, duration of the program, program type (e.g., situation comedy), etc.

Processor 109 may also create in real time trick files associated with program 201 as part of the asset which are used to perform trick mode functions (e.g., rewinding and fast-forwarding) on program 201. One such trick file in this instance is a "fast-forward" trick file which contains an array of identifiers of I-frames in the SPS transport stream (MPEG-2 encoded as mentioned before) corresponding to program 201 in a forward direction. Another trick file is a "rewind" trick file which contains an array of identifiers of I-frames in the SPS transport stream corresponding to program 201 in the reverse direction. The I-frame identifiers in the trick files are used as indices or markers for rewinding and fast-forwarding of program 201. It should be noted that not all of the I-frames associated with program 201 are selected for the trick files. Rather, the I-frames are selected periodically along the program stream. Thus, the shorter the period is, the closer the instants from which program 201 can be rewound, and to which program 201 can be fast-forwarded, thereby achieving finer adjustments.

It should be noted that where program 201 is not an initial broadcast program, which may also be pre-staged, commercial segments 221 and 227 may not contain the commercials originally provided by the program provider. Rather, program 201 may be repackaged with after-market commercials, which may be targeted to the user, and which may even be injected anywhere in the program with no regard for original segments 221 and 227 in terms of their timing, duration, or quantity. In the event that program 201 is pre-staged, the program content comes with the corresponding metadata file and trick files associated with the program. Processor 109 stores the created or pre-staged asset including the metadata file and trick files associated with a program according to its program designation in asset storage (not shown), which may reside in library manager 113 described below.

In one embodiment, the SPS transport streams generated by processor 109, which contain in-progress (or live) TV programs for switched broadcast, are forwarded to switching unit 117, with their copies being fed to cache manager 111 for caching and then library manager 113 for long term storage.

However, in this illustrative embodiment, the SPS transport streams are first fed to cache manager 111. Manager 111 includes a cache memory (not shown), e.g., a disk cache, having a memory capacity on the order of terabytes. Before manager 111 forwards the transport streams to switching unit 117 for switched broadcast, manager 111 copies the transport streams onto the cache memory, and also forwards a copy to library manager 113 for long-term storage and to switching unit 117. The latter includes library storage having a memory capacity on the order of hundreds of terabytes, much larger than that of the cache memory such that the cache memory stores the last Y hours' worth of the TV programs while the library storage stores the last Z hours' worth of the TV program, where the value of Z is much greater than that of Y. It suffices to know for now that use of the cache memory, which affords faster access to its content than the library storage, facilitates a speedy retrieval of a requested program in the event of a "cache hit," i.e., the requested program being within the last Y hour broadcast. Otherwise, a "cache miss" causes locating the requested program in the library storage, thereby incurring a delay in the retrieval of the program.

Switching unit 117 receives the SPS transport streams from cache manager 111 (or directly from A/S processor 109 in the other embodiment) and selectively switches them to hub 120 to realize the switched broadcast. From time to time, switching unit 117 is directed by hub server 164 to switch one or more of the transport streams to hub 120, in accordance with the aforementioned switched broadcast technique. Thus, switching unit 117 may receive from hub server 164 directions to "block" the transport stream containing, say, program channel 1 material because no user in the neighborhood selected program channel 1 to watch. In response, switching unit 117 refrains from switching the program channel 1 transport stream to hub 120. Switching unit 117 may be subsequently directed to resume switching the program channel 1 transport stream to hub 120 when one or more users in the neighborhood have selected program channel 1 to watch.

Hub server 164, among other tasks, communicates various data including control messages with the set-top terminals. Upstream data from a set-top terminal to hub server 164 is communicated via a reverse passband, e.g., 5-40 MHz band, of a coaxial cable. The reverse passband comprises reverse data channels (RDCs) having a 1 MHz bandwidth in this instance, through which quaternary phase shift keying (QPSK) signals containing upstream data are transmitted. It should be noted that the 1 MHz bandwidth allocated for an RDC here is for illustrative purposes only. It will be appreciated that a person skilled in the art may allocate other bandwidths therefor depending on the actual implementations. A set-top terminal utilizes an RDC for sending both application data and control messages. For example, the Digital Audio Visual Council (DAVIC), a standard setting organization, has defined a contention-based access mechanism whereby multiple set-top terminals share an RDC. This mechanism enables the set-top terminals to transmit upstream messages without a dedicated connection to a QPSK demodulator. The mechanism also provides equal access to the set-top terminals that share the RDC, and enables detection and recovery from reverse path collisions that occur when two or more of the terminals transmit an upstream message simultaneously. As also specified by DAVIC, for communications purposes, the set-top terminals and hub server 164 are identified by the Internet protocol (IP) addresses assigned thereto. However, these IP addresses may be randomly assigned each time when system 100 is reconfigured. As a result, the IP address of a set-top terminal or server 164 may change after a system reconfiguration. Nevertheless, each set-top terminal and server 164 is also assigned a media access control (MAC) address on a permanent basis, surviving any system reconfiguration.

Downstream data from hub server 164 to a set-top terminal is communicated via forward data channels (FDCs). These channels, also referred to as "out-of-band" channels, may occupy the 70-130 MHz band of a coaxial cable. QPSK signals containing system messages to a set-top terminal are transmitted through an FDC having a 1 MHz bandwidth in this instance. It should be noted that the 1 MHz bandwidth allocated for an FDC here is for illustrative purposes only. It will be appreciated that a person skilled in the art may allocate other bandwidths therefor depending on the actual implementations.

Switched Broadcast Service Component

In this illustrative embodiment, some of the program channels afford the aforementioned NPVR service (described below), which hereinafter are referred to as "NPVR enabled channels" and are not subject to switched broadcast. On the other hand, those channels which are not NPVR enabled channels and are subject to switched broadcast hereinafter are referred to as "switched broadcast channels." By way of example, a user at a set-top terminal, say, terminal 158-1, turns on the TV associated therewith and selects a particular program channel, say, program channel 2, or change from another channel to channel 2. In such case, terminal 158-1 in a well known manner scans for any MPS transport streams transporting programs to the neighborhood. Terminal 158-1 identifies each MPS transport stream by its transport stream identification (TSID).

Figure 3:
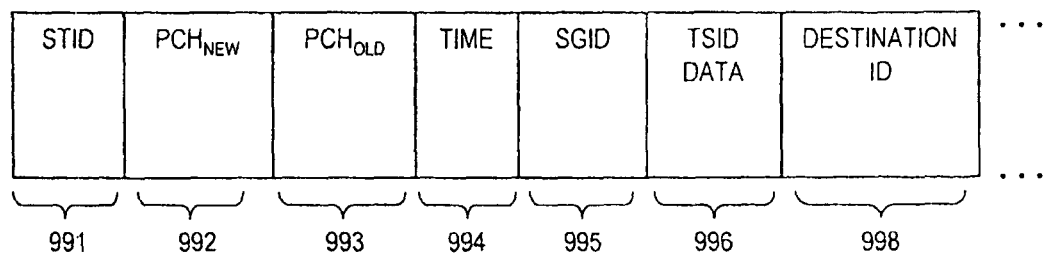
FIG. 3 illustrates a request for program channel material sent from a set-top terminal in the system of FIG. 1.

Terminal 158-1 then sends a program channel request for program channel 2 material, denoted 997 in FIG. 3, to hub server 164 via an RDC. Program channel request 997 comprises, among other information, STID field 991 containing an IP address (and/or MAC address) identifying the requesting set-top terminal, PCHNEW field 992 containing the newly-selected program channel number, PCHOLD field 993 containing the previously-selected program channel number, TIME field 994 containing a time stamp of the request, and service group identification (SGID) field 995 containing an identifier identifying the service group (or neighborhood) to which the set-top terminal belongs. In this instance, terminals 158-1 through 158-L are in the same neighborhood having the same SGID value, which are served by a common modulator facility, e.g., QAM modulator bank 168. Program channel request 997 additionally comprises TSID data field 996 which contains the TSIDs of any MPS transport streams transporting program material to the neighborhood, and Destination ID field 998 which contains the IP address (and/or MAC address) of hub server 164 or network controller 125 to which request 997 is destined. Specifically, if terminal 158-1 based on a channel map therein determines that the newly-selected program channel number corresponds to a switched broadcast channel, it enters in field 998 the IP address of hub server 164; otherwise, if terminal 158-1 determines that the newly-selected program channel number corresponds to a NPVR enabled channel, it enters in field 998 the IP address of on-demand application server 127.

Thus, for example, if the user changes the program channel selection from channel 8 to channel 2 (or in other words "deselects" channel 8 in favor of channel 2), the value of PCHNEW field 992 would be set to "2" and that of PCHOLD field 993 would be set to "8." If the user has just turned on the cable TV to watch program channel 2, the value of PCHNEW field 992 in that instance would be set to "2" and that of PCHOLD field 993 would be set to "0," indicating an off state. Conversely, if the user who has been watching program channel 2 chooses to turn off the cable TV, the value of PCHNEW field 992 would be set to "0" and that of PCHOLD field 993 would be set to "2."

In one embodiment, when hub server 164 receives program channel request 997 from a set-top terminal for a desired switched broadcast program channel, it reads the received program channel request to learn the TSIDs in field 996, and the identity of the requested program channel in field 992.

Referring to broadcast usage table 850 in FIG. 4, table 850 which may be maintained in hub 120 is associated with the neighborhood or service area identified by SGID in field 995 (e.g., the neighborhood corresponding to node 150 in this instance). Table 850 includes column 854 which lists each switched broadcast channel X, e.g., 1, 2, 5, 9 . . . , offered by the cable operator in system 100. In this instance, referring to row 861, program channel 2 is a switched broadcast channel.

Column 855 tracks, for each switched broadcast channel X, the number of users (or set-top terminals) in the service area which have selected to watch materials from that channel (NPCHX). Columns 856 and 857 list, for each switched broadcast channel X, a TSID and a program ID (PID) identifying, respectively, the MPS transport stream, and the broadcast program stream within the MPS transport stream which contains the program channel X material. Column 858 includes an ID of a carrier assigned to carry the MPS transport stream identified by a respective TSID in column 856.

Figure 5:
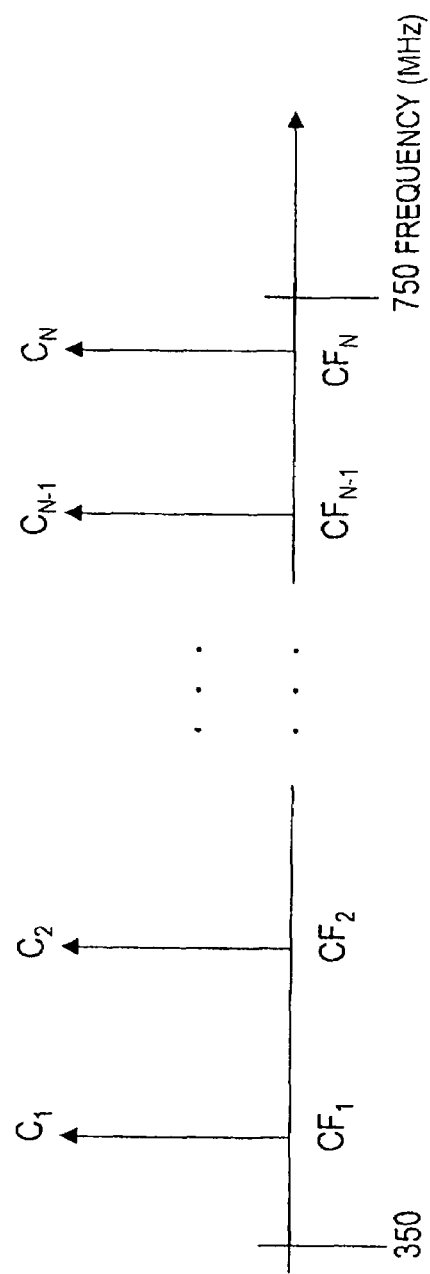
FIG. 5 illustrates selected carriers for transmitting program channel materials in a forward passband of the system of FIG. 1.

FIG. 5 illustrates N carriers, C1 through CN, associated with N transmission channels in the forward passband ranging from 350 MHz to 750 MHz, where N represents an integer. Each carrier may be used to carry an MPS transport stream which may include nine or more program streams in this instance. As shown in FIG. 5, the carrier frequency of C1 is denoted CF1; the carrier frequency of C2 is denoted CF2; . . . ; and the carrier frequency of CN is denoted CFN.

Thus, with broadcast usage table 850, hub server 164 has knowledge that, for example, referring to row 861, switched broadcast channel 2 material contained in the broadcast program stream having PID=1001 is transmitted to the neighborhood via the MPS transport stream having TSID=4, which is carried by carrier C4. Hub server 164 may also determine from table 850 that 12 users (NPCHX=12) have selected to watch switched broadcast channel X=2. In addition, as indicated in row 863, no user (NPCHX=0) has chosen to watch material from switched broadcast channel X=1. Thus, no MPS transport stream (Null), and no carrier (Null), is assigned to carry material for switched broadcast channel 1. That is, switched broadcast channel 1 material is currently not being transmitted to service area node 150 and thus not currently made available to set-top terminals 158-1 through 158-L.

Also relying on broadcast usage table 850, hub server 164 sends a message to network controller 125, causing switching unit 117 in headend 105 to block or to not switch an SPS transport stream carrying switched broadcast channel X material to hub 120 when NPCHX changes from a non-zero value to zero. The blocked SPS transport stream may be reinstated when the switched broadcast channel X material is requested again by at least one set-top terminal in the neighborhood. When an SPS transport stream is blocked, hub server 164 also sends a message to resource manager 166, informing resource manager 166 that the network capacity otherwise utilized for transmission of the switched broadcast channel material in the SPS transport stream can be reallocated.

If the requested switched broadcast channel 2 material is currently being transmitted to the neighborhood, hub server 164 determines the TSID of the MPS transport stream (i.e., 4 in this instance), and the PID of the broadcast program stream (i.e., 1001 in this instance) within the MPS transport stream, which contains the requested program channel material to the neighborhood. Using table 850, hub server 164 also identifies the carrier (i.e., C4 in this instance) that carries the MPS transport stream based on the TSID.

Hub server 164 sends, through QPSK modem pool 169, a message responsive to request 997 to the set-top terminal identified by the request origination IP (and/or MAC) address in field 991 (in this instance, terminal 158-1). This message traversing an FDC contains the information concerning the carrier frequency of the identified carrier C4 to which terminal 158-1 should tune to receive the appropriate MPS transport stream, and the PID=1001 for extracting the desired broadcast program stream, containing in this instance program channel 2 material, within the MPS transport stream. The extracted broadcast program stream is processed by the set-top terminal in a conventional manner before it is fed to its associated TV set for showing the switched broadcast channel 2 material contained therein.

If the requested switched broadcast channel material is not currently being transmitted to the neighborhood, hub server 164 sends a message through network controller 125 to switching unit 117 to switch the SPS transport stream, i.e., the MPEG-2 encoded broadcast program stream, containing the requested broadcast channel material, to hub switch 162. At the same time, hub server 164 causes resource manager 166 to allocate capacity in network 140 for transmission of the underlying broadcast program stream. Resource manager 166 causes hub switch 162 to switch the SPS transport stream to a selected input port of QAM modulator bank 168, where its underlying broadcast program stream is multiplexed and encoded with other broadcast program streams or dedicated program streams (described below), in accordance with a well known MPEG-2 scheme. The resulting MPS transport stream identified by a TSID is modulated onto an assigned carrier transmitted to the neighborhood, in accordance with a well known QAM scheme. Resource manager 166 also provides to hub server 164 the TSID of the MPS transport stream, the PID of the broadcast program stream, and the ID of the assigned carrier for its update of table 850. Hub server 164 sends to set-top terminal 158-1 a message responsive to its previous program channel request. As described before, such a message contains the information concerning the assigned carrier frequency to which terminal 158-1 should tune to receive the appropriate MPS transport stream, and the PID for extracting the desired broadcast program stream, containing in this instance switched broadcast channel 2 material, within the MPS transport stream.

To effectively allocate the limited network capacity, resource manager 166 in this instance maintains a resource assignment table, denoted 470 in FIG. 6. As shown in FIG. 6, table 470 includes column 474 which enumerates various carriers, e.g., C1, C2, etc., that may be utilized to carry MPS transport streams to set-top terminals in the neighborhood. Columns 475 lists the TSIDs identifying the MPS transport streams carried by the respective carriers. By way of example, in this instance the MPS transport stream having TSID=1 is carried by carrier C1; the MPS transport stream having TSID=2 is carried by carrier C2; so on and so forth. Column 476 enumerates the PIDs of the program streams incorporated in the MPS transport streams having the respective TSIDs. Each program stream in this instance may be a broadcast program stream (BPS), e.g., BPS-5, BPS-9, BPS-16 . . . in column 477, containing switched broadcast channel material for sharing among set-top terminals in the neighborhood, or a dedicated program stream (DPS), e.g., DPS-2, DPS-10, DPS-30 . . . in column 477, containing NPVR enabled channel material for a particular set-top terminal in the neighborhood. In this example, BPS-5 denotes a broadcast program stream containing switched broadcast channel 5 material; BPS-9 denotes a broadcast program stream containing switched broadcast channel 9 material, etc. On the other hand, DPS-2 denotes a dedicated program stream containing NPVR enabled channel material for the particular set-top terminal 158-2; DPS-10 denotes a dedicated program stream containing NPVR enabled channel material for the particular set-top terminal 158-10, etc.

In addition, column 478 enumerates, for each modulator in bank 168, different input ports of the modulator to which hub switch 162 switches the SPS transport streams from which the respective program streams are derived. Each modulator in bank 168 is associated with a different carrier. In this example, modulator M1 in bank 168 is associated with carrier C1, which modulates the MPS transport stream having TSID=1 onto C1; modulator M2 in bank 168 is associated with carrier C2, which modulates the MPS transport stream having TSID=2 onto C2; so on and so forth. Referring to row 481, modulator M1 in this instance has at its input port 1 (i.e., M1/P1) the SPS transport stream corresponding to BPS-5. Referring to row 485, modulator M1 in this instance has at its input port 5 (M1/P5) no SPS transport stream, i.e., no corresponding program stream (i.e. "NULL") incorporated in the MPS transport stream (TSID=1). In other words, there is unused capacity available for transmission of a new program stream, which is to be incorporated into the MPS transport stream having TSID=1. Thus, resource manager 166 may cause hub switch 162 to switch the SPS transport stream corresponding to such a new program stream to M1/P5 to take advantage of the unused capacity. The new program stream may be assigned a PID=1005 to distinguish it from other program streams in the same MPS transport stream having TSID=1.

Column 479 enumerates the input ports of hub switch 162 from which SPS transport streams are switched to the respective modulator/input ports indicated in column 478. For example, referring to row 481, an SPS transport stream at input port 2 of hub switch 162 (SWP2) in this instance is switched thereby to input port 1 of modulator M1 (M1/P1). Referring to row 485, no SPS transport stream in this instance is provided at an input port of hub switch 162 ("NULL") for it to switch to input port 5 of modulator M1 (M1/P5).

Thus, hub switch 162 receives SPS transport streams from headend 105 at its input ports, and under control of resource manager 166 switches the SPS transport streams to selected input ports of one or more modulators in QAM modulator bank 168, in accordance with table 470. As described before, the modulators derive the underlying program streams from the received SPS transport streams, and multiplex and encode the program streams to form the MPS transport streams, in accordance with the well known MPEG-2 scheme. The modulators then transmit the associated carriers modulated by the respective MPS transport streams over HFC cable network 140.

Figure 7:
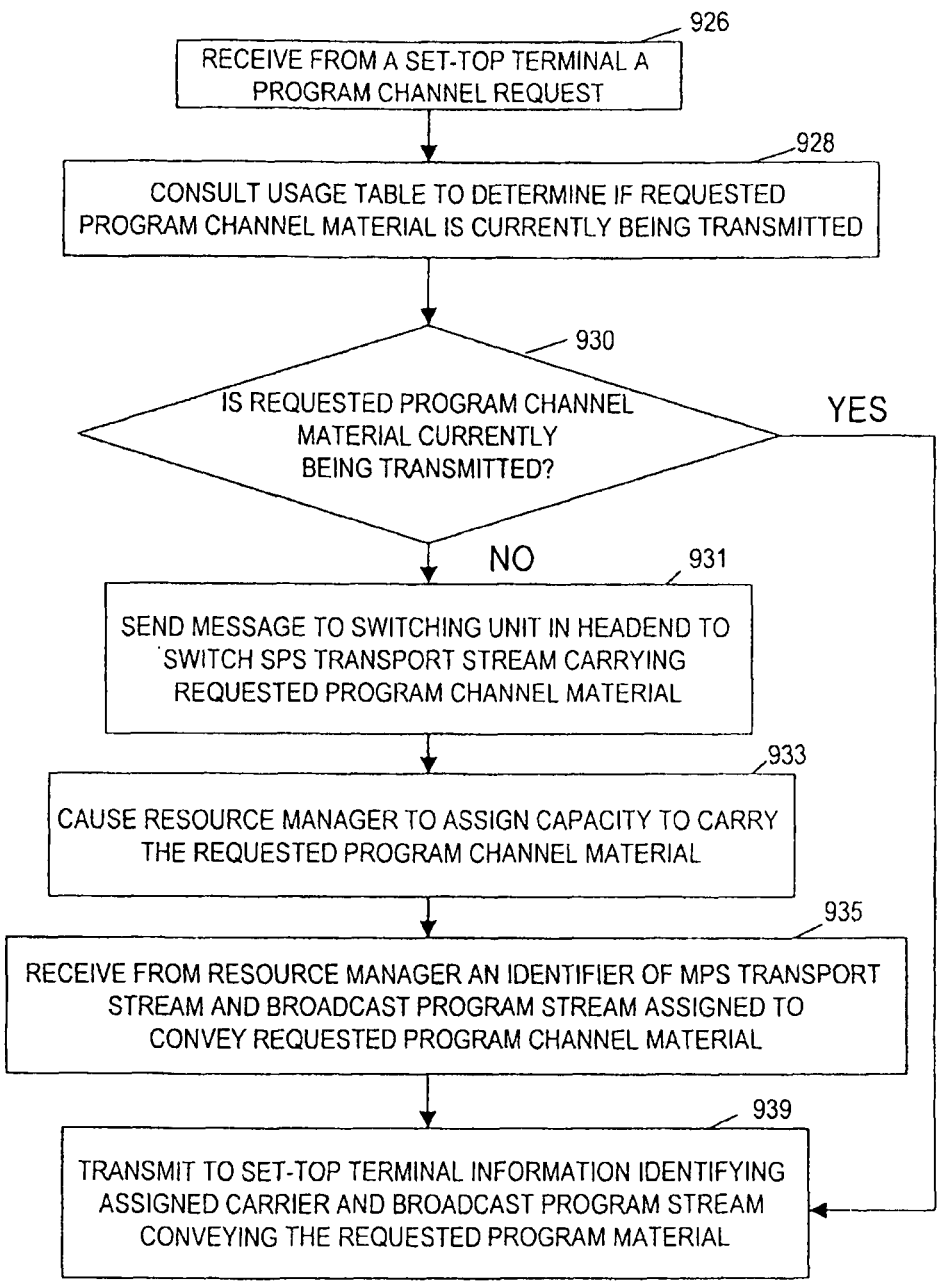
FIG. 7 is a flowchart depicting a routine for dynamically managing the system resources for providing the switched broadcast service, in accordance with an embodiment of the invention.

FIG. 7 is a flowchart depicting a routine for dynamically allocating capacity for transmission of program channel material, according to this embodiment. This routine is also discussed with reference to broadcast usage table 850. At step 926, hub server 164 receives from a set-top terminal, e.g., terminal 158-1, a program channel request. For example, hub server 164 may receive from terminal 158-1 a request for broadcast program channel 2 material. In one embodiment, the program channel request is in the form shown in FIG. 3, identifying, among other information, the requesting set-top terminal by origination IP (and/or MAC) address, and the requested program channel, e.g., program channel 2. At step 928, hub server 164 consults usage table 850 to determine whether the requested program channel material is currently being transmitted to the neighborhood, which is the case here. In this embodiment, a non-zero value in column 855 of usage table 850 indicates that the corresponding program channel material is currently being broadcast to the neighborhood. Referring to block 930, in this instance hub server 164 at step 939 transmits a message to the set-top terminal identified by the origination IP (and/or MAC) address, which contains the information concerning the carrier frequency to which the terminal should tune to receive the appropriate MPS transport stream, and the program ID (PID) for extracting the broadcast program stream carrying the requested material—in this instance, program channel 2 material—from the MPS transport stream.

Supposing, on the other hand, that the requested program channel material is not currently being transmitted to the neighborhood, hub server 164 at step 931 transmits a message to switching unit 177 in headend 105 to switch the SPS transport stream carrying the requested program channel material to hub 120. Additionally, hub server 164 (at step 933) causes resource manager 166 to allocate capacity to carry the requested program channel material. Hub server 164 provides to resource manager 166 information concerning the requested program channel. In response, resource manager 166 consults assignment table 470 to identify available capacity, e.g., by identifying an unused program stream capacity within an MPS transport stream, or an unused carrier. If capacity is available, resource manager 166 then directs hub switch 162 to switch the SPS transport stream containing the requested program channel material to a selected port of QAM modulator bank 168.

At step 935, hub server 164 receives from resource manager 166 an identification of the MPS transport stream (i.e., TSID), and of the broadcast program stream (i.e., PID) within the MPS transport stream, that are assigned to convey the requested program channel material, and an identification of the assigned carrier frequency. At step 939, hub server 164 transmits to the requesting set-top terminal information concerning the carrier frequency to which the set-top terminal should tune to receive the MPS transport stream, and the PID of the broadcast program stream containing the requested program channel material.

NPVR Service Component

As mentioned before, a user at a set-top terminal requesting material from an NPVR enabled channel is provided with a dedicated program stream for his/her exclusive use so that the user may rewind, pause and/or fast-forward the program presentation at will. To that end, when on-demand application server 127 receives program channel request 997 directed thereto, server 127 causes resource manager 166 to allocate capacity for a dedicated program stream to carry the requested NPVR enabled channel material. Server 127 provides to resource manager 166 information concerning the identity of the set-top terminal issuing the request. In response, resource manager 166 consults assignment table 470 to identify available capacity, e.g., by identifying an unused program stream capacity within an MPS transport stream, or an unused carrier. By way of example, referring to row 485, resource manager 166 in this instance takes advantage of the unused program stream capacity, say, PID=5 to be assigned, in the MPS transport stream with TSID=1. In addition, resource manager 166 assigns an unused input port of hub switch 162, say, SWP 9, to which the SPS transport stream containing the requested program channel material is switched by switching unit 117 in headend 105. Resource manager 166 also directs hub switch 162 to switch any impending SPS transport stream at the assigned input port, i.e., SWP 9, to the input port 5 of modulator M1 (M1/P5), thereby utilizing the unused capacity of the MPS transport stream having TSID=1.

Resource manager 166 provides to server 127 information concerning the carrier frequency $CF_1$ of carrier $C_1$ carrying the MPS transport stream (TSID=1), the PID=1005 identifying the dedicated program stream within the MPS transport stream, and the input port of hub switch 162 (SWP 9) to which the SPS transport stream containing the requested program channel material is to be switched. Server 127 communicates to media processor 119 a first message containing a service ID of the requested NPVR enabled channel, and the assigned hub switch input port ID, i.e., SWP 9 in this instance. Server 127 sends, through QPSK modem pool 127, a second message responsive to the program channel request to the requesting set-top terminal identified by the STID in the request. This second message contains information concerning the carrier frequency, i.e., $CF_1$, to which the requesting terminal should tune to receive the appropriate MPS transport stream, and the PID=1005 for extracting the desired dedicated program stream, containing the requested NPVR enabled channel material, within the MPS transport stream.

In response to the first message, processor 119 directs cache manager 111 to deliver thereto a copy of the SPS transport stream containing material of the NPVR enabled channel identified by the service ID in the message. In addition, processor 119 causes switching unit 117 to switch the resulting "dedicated" transport stream to input port SWP 9 of hub switch 162. Accordingly, hub switch 162, instructed by resource manager 166, switches the dedicated transport stream to M1/P5 to be incorporated in the MPS transport stream (TSID=1), which is modulated onto carrier $C_1$ transmitted to the neighborhood.

Based on the information in the second message, the requesting set-top terminal, say, terminal 158-1, tunes to the carrier frequency $CF_1$ to receive the transmitted MPS transport stream, and extracts therefrom the dedicated program stream (PID=1005) containing the requested NPVR enabled channel material. In a well known manner, the set-top terminal converts the extracted program to appropriate signals for the associated TV to play the NPVR enabled channel material.

While the program material is being played, terminal 158-1 continuously registers the last I-frame identifier in the received dedicated program stream. From time to time, terminal 158-1 sends a "heartbeat" containing the IP (and/or MAC) address identifying terminal 158-1 and the last I-frame identifier to media processor 119. Processor 119 keeps, for terminal 158-1, a record identified by the IP (and/or MAC) address of terminal 158-1, and tracks the program being transmitted to terminal 158-1 and its I-frame progress. When processor 119 no longer receives heartbeats from terminal 158-1, e.g., because of an off state of the terminal, processor 119 may verify such an off state by polling terminal 158-1. If the latter does not respond to the poll affirmatively, processor 119 may cause the transmission of the dedicated program stream to terminal 158-1 to be halted, and allow resource manager 166 to reassign the resources therefor for transmission of another program stream.

Figure 8:
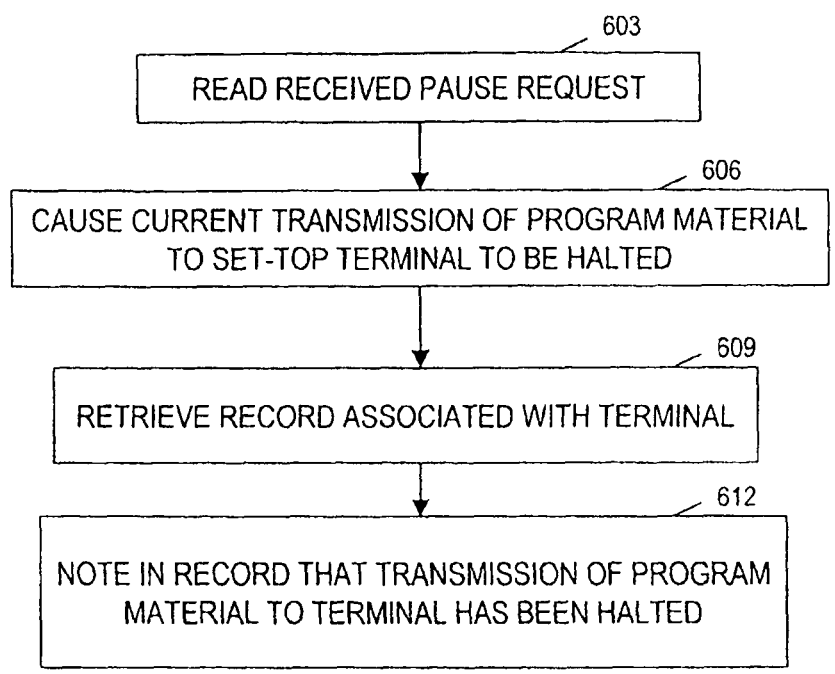
FIG. 8 is a flowchart depicting a routine for responding to a pause request received from a set-top terminal in providing the NPVR service, in accordance with an embodiment of the invention.

When the user issues a pause command to terminal 158-1, e.g., by pressing a "pause" key on a remote control associated therewith to temporarily stop the progress of the program, terminal 158-1 issues a pause request to media processor 119 identified by its IP address. The pause request in this instance includes a pause initiation command, the last I-frame identifier registered by terminal 158-1, and the IP and/or MAC address of terminal 158-1. After issuing the pause request, terminal 158-1 enters a pause state and causes the picture corresponding to the next I-frame, say I-frame$_{pause}$, to be frozen on the TV screen, thereby achieving the pause effect. After receiving the pause request, processor 119 reads the received pause request, as indicated at step 603 in FIG. 8. Processor 119 at step 606 causes the current transmission of program material to set-top terminal 158-1 (identified by the received IP and/or MAC address) to be halted at the I-frame immediately following the last I-frame identified in the received request. Processor 119 at step 609 retrieves the record associated with terminal 158-1. Processor 119 at step 612 notes in the record that the transmission of the program material to terminal 158-1 has been halted at I-frame$_{pause}$.

When the user issues a command to resume viewing the program material, e.g., by toggling the pause key on the remote control, terminal 158-1 exits the pause state, sends a resumption request to processor 119, and readies itself to receive the program material in a dedicated program stream starting from I-frame$_{pause}$. This resumption request includes a resumption command, and the IP and/or MAC address of terminal 158-1. After reading the received resumption request, processor 119 retrieves the record associated with terminal 158-1 identified by the received IP and/or MAC address. In response to the resumption command, processor 119 causes the transmission of the program material to terminal 158-1 to be restarted from I-frame$_{pause}$, and notes in the record the transmission resumption event. As a result, terminal 158-1 resumes receiving the program material in the same dedicated program stream delivered thereto before. It should be noted that use of a MAC address, instead of an IP address, to identify terminal 158-1 may be advantageous here especially when the pause state is long, so much so that a reconfiguration of system 100 may have occurred during such a state. In that case, the IP address identifying terminal 158-1 before the system reconfiguration may be different than that after the reconfiguration, and as a result, by using only the pre-reconfiguration IP address of terminal 158-1 for its identification, the resuming dedicated program stream would not be delivered to the intended terminal 158-1 after the reconfiguration. On the other hand, since the MAC address of terminal 158-1 is immutable and survives any system reconfiguration, by relying on the MAC address of terminal 158-1 for its identification here, the resuming dedicated program stream would be correctly delivered to terminal 158-1 even after a system reconfiguration.

Figure 9:
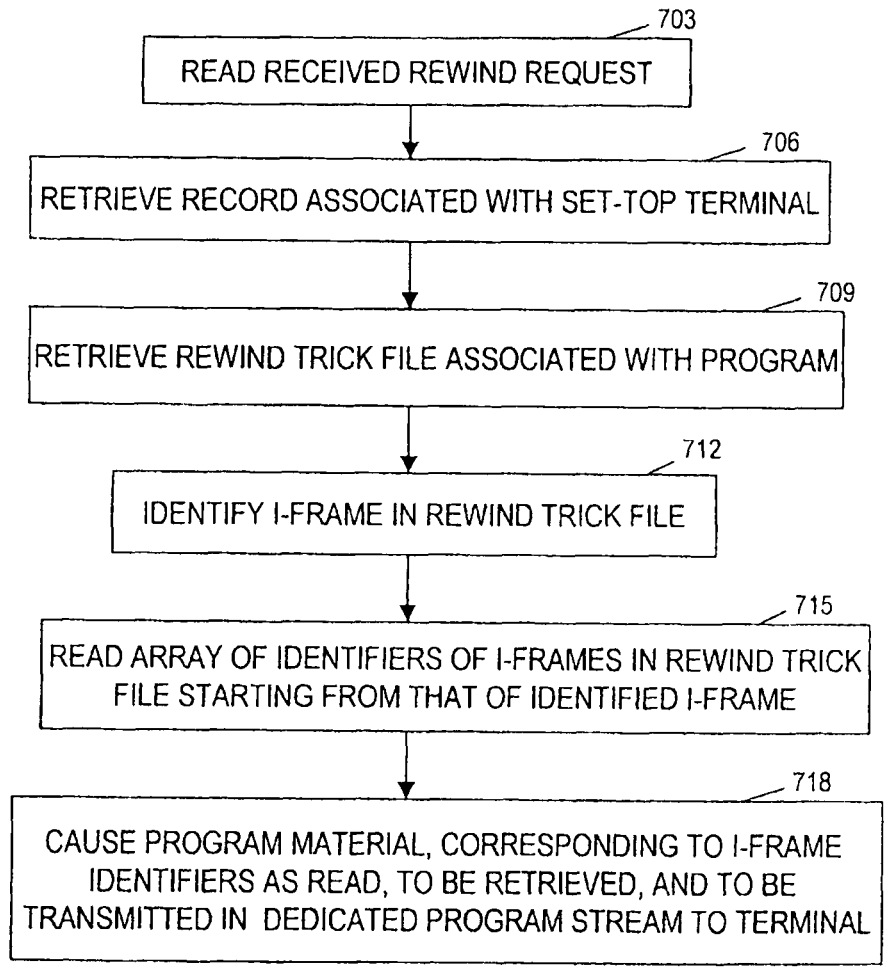
FIG. 9 is a flowchart depicting a routine for responding to a rewind request received from a set-top terminal in providing the NPVR service, in accordance with an embodiment of the invention.

While viewing a program, the user may issue a rewind command, e.g., by pressing a rewind key on the remote control, to rewind the program. In that case, terminal 158-1 issues a rewind request to processor 119 identified by its IP address. This rewind request includes a rewind initiation command, the last I-frame identifier registered by terminal 158-1, and the IP address (and/or MAC address) identifying terminal 158-1. After receiving such a rewind request, processor 119 reads the received rewind request, as indicated at step 703 in FIG. 9. Processor 119 at step 706 retrieves the record associated with set-top terminal 158-1 identified by the received IP address (and/or MAC address). Knowing from the record the identity of the program being transmitted, processor 119 at step 709 retrieves from the aforementioned asset storage the rewind trick file associated with the program. Based on the last I-frame information in the received request, processor 119 at step 712 identifies the I-frame in the rewind trick file which either matches or is the closest to that last I-frame. Processor 119 at step 715 reads the array of identifiers of the I-frames in the rewind trick file starting from that of the identified I-frame. Processor 119 at step 718 causes the program material, corresponding to the I-frame identifiers as read, to be retrieved from cache manager 111, and to be transmitted in a dedicated program stream to terminal 158-1, thereby achieving the desired rewind effect.

When the user issues a command to stop rewinding the program, e.g., by toggling the rewind key on the remote control, terminal 158-1 sends a rewind termination request to processor 119. This request includes a rewind termination command, and the IP address (and/or MAC address) of terminal 158-1. In response to the rewind termination command, processor 119 stops reading the rewind trick file associated with the program. Processor 119 learns from the record associated with terminal 158-1 the last I-frame identifier read from the rewind trick file. Processor 119 causes retrieval of the program material at the normal forward speed from cache manager 111 starting from the I-frame identified by the last read identifier, and transmission of the retrieved program material to terminal 158-1. As a result, terminal 158-1 resumes receiving the program material at the normal forward speed in the same dedicated program stream.

Figure 10:
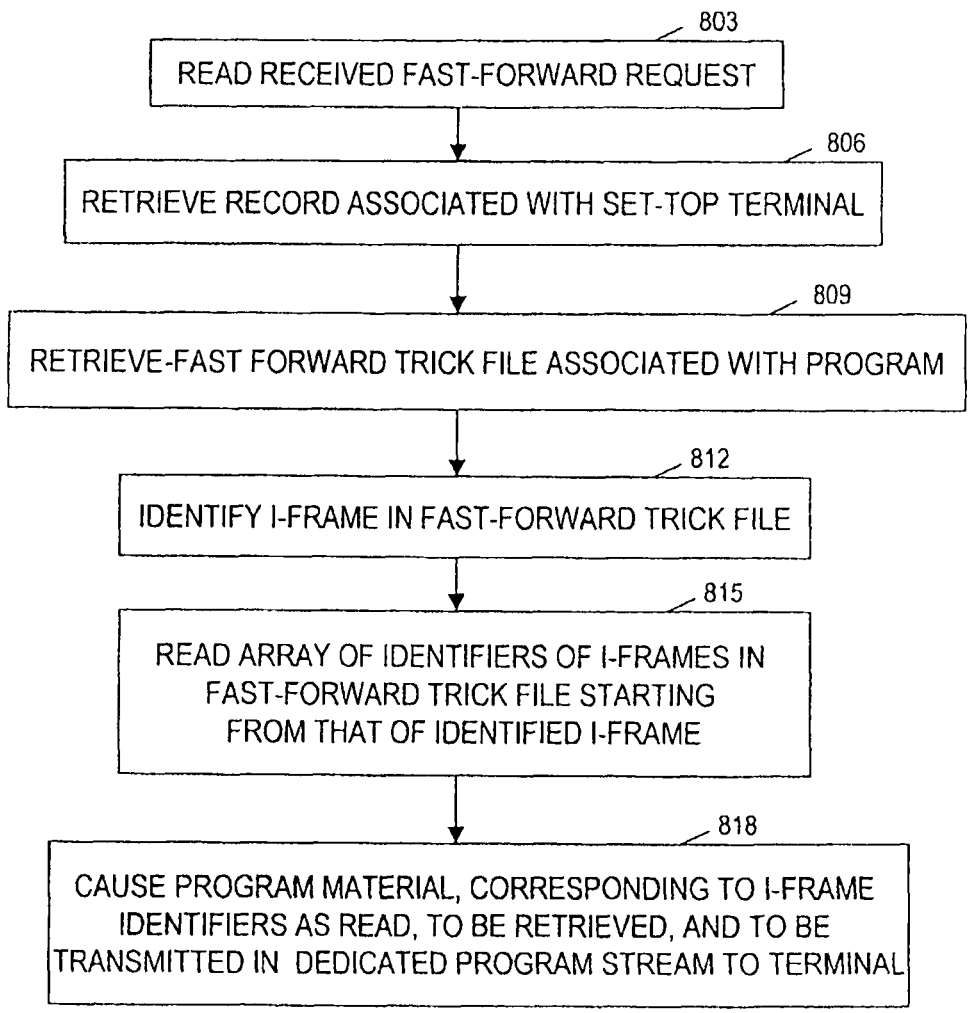
FIG. 10 is a flowchart depicting a routine for responding to a fast-forward request received from a set-top terminal in providing the NPVR service, in accordance with an embodiment of the invention.

After rewinding a program, the user may issue a fast-forward command, e.g., by pressing a fast-forward key on the remote control, to fast-forward the program. In that case, terminal 158-1 issues a fast-forward request to processor 119 identified by its IP address. This fast-forward request includes a fast-forward initiation command, the last I-frame identifier registered by terminal 158-1, and the IP address (and/or MAC address) identifying terminal 158-1. After receiving such a fast-forward request, processor 119 reads the received fast-forward request, as indicated at step 803 in FIG. 10. Processor 119 at step 806 retrieves the record associated with set-top terminal 158-1 identified by the received IP address (and/or MAC address). Knowing from the record the identity of the program being transmitted, processor 119 at step 809 retrieves from the aforementioned asset storage the fast-forward trick file associated with the program. Based on the last I-frame information in the received request, processor 119 at step 812 identifies the I-frame in the fast-forward trick file which either matches or is the closest to that last I-frame. Processor 119 at step 815 reads the array of identifiers of the I-frames in the fast-forward trick file starting from that of the identified I-frame. Processor 119 at step 818 causes the program material, corresponding to the I-frame identifiers as read, to be retrieved from cache manager 111, and to be transmitted in a dedicated program stream to terminal 158-1, thereby achieving the desired fast-forward effect.

When the user issues a command to stop fast-forwarding the program, e.g., by toggling the fast-forward key on the remote control, terminal 158-1 sends a fast-forward termination request to processor 119. This request includes a fast-forward termination command, and the IP address (and/or MAC address) of terminal 158-1. In response to the fast-forward termination command, processor 119 stops reading the fast-forward trick file associated with the program. Processor 119 learns from the record associated with terminal 158-1 the last I-frame identifier read from the fast-forward trick file. Processor 119 causes retrieval of the program material at the normal forward speed from cache manager 111 starting from the I-frame identified by the last read identifier, and transmission of the retrieved program material to terminal 158-1. As a result, terminal 158-1 resumes receiving the program material at the normal forward speed in the same dedicated program stream.

Based on the disclosure heretofore, it is apparent to a person skilled in the art that the above-described interactivities between a set-top terminal and media processor 119 in serving a broadcast program from an NPVR enabled channel similarly apply to serving of other types of asset, e.g., a music video, news event, weather report, traffic report, sports event, video-on-demand (VOD), an audio-on-demand, etc. For example, the VOD assets may be stored in the library storage in library manager 113. In serving a VOD requested by a user, media processor 119 incorporates also other well known VOD server functions (e.g., receiving VOD requests, scheduling video presentations, etc.) retrieves a copy of the requested VOD from the library storage and caches the copy while serving the VOD. Subsequent requests for the same VOD would trigger a cache hit, thereby expediting the VOD presentation. In fact, in another embodiment, a number of caches, in addition to that in manager 111, are placed at selected delivery points in system 100, e.g., at an input to modulator bank 168, to cache any assets recently requested by, or delivered to, users in the hope that the same assets will be requested repeatedly because of their popularity, thereby increasing the chance of a cache hit.

The foregoing merely illustrates the principles of the invention. It will thus be appreciated that those skilled in the art will be able to devise numerous other arrangements which embody the principles of the invention and are thus within its spirit and scope.

For example, in the disclosed embodiment, the integrated switched broadcast and NPVR service in accordance with the invention is illustratively deployed to a single neighborhood or service area. The invention equally applies to multiple neighborhood or service areas. In that case, multiple QAM modulator banks similar to bank 168 may be employed in hub 120, which correspond to the respective neighborhoods. In addition, hub server 164 may maintain multiple usage tables similar to table 850, which correspond to the respective neighborhoods.

Finally, system 100 is disclosed herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

What is claimed is:

1. A system for providing program material to a plurality of devices in an area via a communications network, the system comprising:
   a first processing device configured to:
   receive program content from a plurality of sources in the form of respective program streams to be provided to users in accordance with a first, broadcast service for sharing among devices in an area or a second, on demand service for exclusive use by a requesting device;
   reformat the program streams into first and second single program stream transport streams encoded at a constant bit rate, the first single program transport streams containing respective program material to be provided to devices in accordance with the first, broadcast service and the second single program stream transport streams to be provided in accordance with the second, on demand service; and
   store respective second single program stream transport streams to be provided in accordance with the second, on demand service, in a storage device as respective assets; and
   at least one mechanism configured to:
   integrate first single program stream transport streams into first multiple program stream transport streams; and
   provide the first multiple program stream transport streams to the area in accordance with the first, broadcast service via the network for sharing among devices in the area, each of the first single program stream transport streams being received by one or more devices in the area;
   wherein the system further comprises:
   at least one second processing device configured to:
   withhold provision of a respective first single program stream transport stream to the area if no devices in the area are to receive the respective first single program stream transport stream, thereby making available transmission capacity for a second single program stream transport stream to be provided to a device in the area in accordance with the second, on demand service;
   receive requests for program material associated with the second, on demand service, from respective devices in an area; and
   generate the second single program stream transport streams from the stored assets containing the requested program materials in accordance with the second, on demand service for exclusive use by respective requesting devices;

wherein the at least one mechanism is further configured to:
   integrate at least one of the generated second single program stream transport streams with at least one first single program stream transport stream to be provided to the area in at least a portion of the transmission capacity made available by withholding provision of a respective first single program stream transport stream, to form second multiple program stream transport streams; and
   provide the second multiple program stream transport streams to the area.

2. The system of claim 1, wherein the at least one second processing device is further configured to:
   identify to respective second devices respective first program stream transport streams containing the requested program material.

3. The system of claim 1, wherein the at least one second processing device is further configured to track a number of devices in the area selecting each channel associated with the first, broadcast service.

4. The system of claim 1, further comprising a control element to block respective first program stream transport streams from delivery to the area under the control of the second processing device, if no devices in the area select a respective channel associated with the respective first program stream.

5. The system of claim 1, wherein the second, on demand service allows manipulation of presentations of requested program material in second program stream transport streams.

6. The system of claim 1, wherein the second, on demand service includes program material provided according to a broadcast schedule.

7. The system of claim 1, wherein: the network comprises a cable television network; and at least some of the devices in the area include a set-top terminal for receiving cable television broadcast via the cable television network.

8. The system of claim 1, further comprising a service area node coupling the plurality of devices in the area to the network.

9. A system for providing program material to a plurality of devices in an area via a communications network, the system comprising:
   a first processing device configured to:
      receive program content from a plurality of sources in the form of respective program streams to be provided to users in accordance with a first, broadcast service for sharing among devices in an area or a second, on demand service for exclusive use by a requesting device;
      store respective second single program stream transport streams to be provided in accordance with the second, on demand service, in a storage device as assets;
      generate at least one file to manipulate respective program content in accordance with the second, on demand program service, the at least one file being based on a respective second single program stream; and
      store the at least one file in the storage device in addition to storing the second single program stream;
   the system further comprising:
   at least one mechanism configured to provide multiple program stream transport streams comprising multiple first program stream transport streams containing respective program material to the area in accordance with a first, broadcast service for sharing among devices in the area, in at least one transport stream, via the network, the respective first program stream transport streams being received by at least one device in the area;
   at least one second processing device configured to:
      receive requests for program material attributed to at least one selected channel associated with the first, broadcast service or the second, on demand service, respectively, from respective devices in an area;
      for requests for program material attributed to selected program channels associated with the first, broadcast service, identify to requesting devices respective first single program stream transport streams containing the requested program material, and identify the respective multiple program stream transport stream containing the respective single program stream transport stream to the respective requesting devices;
      withhold provision of a respective first single program stream transport stream to the area if no devices in the area select a respective channel associated with the respective first single program stream transport stream, thereby making available transmission capacity in the at least one transport stream for a second single program stream transport stream to be provided to a device in the area in accordance with the second on demand service;
      for requests for selected program channels associated with the second, on demand service, generate second single program stream transport streams containing the requested program material for exclusive use by respective requesting devices, from the stored respective second single program stream transport streams;
      for requests to manipulate program material provided in accordance with the second, on demand service, generate respective third single program stream transport streams based, at least in part, on the at least one respective file; and
      integrate the generated second single program stream transport streams and generated third single program stream transport streams with first single program stream transport streams in the at least one multiple program stream transport stream to be provided to the area by the mechanism, in at least a portion of the transmission capacity made available by withholding provision of respective first program stream transport streams, the respective second and third program stream transport streams being for the exclusive use of respective requesting devices.

10. The system of claim 9, further comprising a control element to block respective first program stream transport streams from delivery to the area under the control of the at least one processing unit, if no devices in the area select a respective channel associated with the respective first program stream transport stream.

11. The system of claim 9, wherein manipulation of a presentation of the requested program material comprises rewinding or fast forwarding the requested program material.

12. The system of claim 9, wherein:
   the communications network comprises a cable television network; and
   at least some of the devices in the area include a set-top terminal for receiving cable television broadcast via the cable television network.

13. The system of claim 9, further comprising a service area node coupling the plurality of devices in the area to the network.

14. A method for providing program material to a plurality of devices in an area via a communications network, the method comprising:
   receiving program content from a plurality of sources in the form of respective program streams to be provided to users in accordance with a first, broadcast service for sharing among devices in an area or a second, on demand service for exclusive use by a requesting device;

reformatting the program streams into respective first and second single program stream transport streams encoded at a constant bit rate;

storing the second single program stream transport streams in storage device as assets;

providing the first single program stream transport streams containing program material to the area in accordance with the first, broadcast service via a cable television network, for sharing among devices in the area in first multiple program stream transport streams;

receiving requests for program material associated with the second, on demand service, from respective devices in the area;

generating second single program stream transport streams in response to the requests for program material associated with the second on demand service, from the stored assets, for exclusive use by respective requesting devices;

withholding provision to the area of respective first single program stream transport streams not received by any device in the area, thereby making available transmission capacity for the second single program stream transport stream;

integrating at least one of the generated second single program stream transport streams with at least one first single program stream transport stream provided to the area in at least a portion of the transmission capacity made available by withholding provision of respective first single program stream transport streams, to form second multiple program stream transport streams; and provide the second multiple program stream transport streams to the area including at least one second single program stream transport stream.

15. The method of claim 14, further comprising:
receiving second requests for program material associated with the first, broadcast service from respective devices in an area; and
identifying to requesting devices respective first program stream transport streams containing the requested program material.

16. The method of claim 14, further comprising:
tracking a number of devices in the area selecting each channel associated with the first service.

17. The method of claim 16, comprising withholding provision of respective first program stream transport streams by blocking the respective first program stream transport streams associated with non-selected channels from delivery to the area.

18. The method of claim 14, further comprising:
receiving requests to manipulate presentation of program material in second program stream transport streams from respective devices; and
manipulating the presentations of the provided program material, in accordance with the requests.

19. The method of claim 14, comprising providing program material in accordance with the second, on demand service, according to a broadcast schedule.

20. The method of claim 14, comprising: receiving the requests from set-top terminals for receiving cable TV.

21. The method of claim 15, comprising:
receiving the first and second requests from devices in the area and providing the first and second program stream transport streams to respective devices through a service area node.

22. The method of claim 15, comprising:
receiving first requests for program material attributed to at least one channel associated with the second, on demand service; and
receiving second requests for program material attributed to at least one channel associated with the first, broadcast service.

23. The system of claim 9, wherein the at least one second processor is further configured to:
track a number of devices in the area selecting each channel associated with the first service.

24. The system of claim 9, wherein, in response to the request to manipulate program content in accordance with the second, on demand service from a requesting device, the at least one second processor is further configured to:
halt transmission of a second single program transport stream to the requesting device, in the respective first multiple program stream transport stream; and
start transmission of the generated third single program transport stream to the requesting device for exclusive use by the requesting device; and
in response to a request to stop manipulating the program content, halt transmission of the generated third single program transport steam; and
resume transmission of the second single program streams transport stream at an appropriate location, in the first multiple program stream transport stream.

25. The system of claim 1, wherein the program streams are reformatted into first and second single program stream MPEG transport streams.

26. The method of claim 14, comprising reformatting the program streams into first and second single program stream MPEG transport streams.

* * * * *